United States Patent

Lindquist et al.

[15] 3,665,918
[45] May 30, 1972

[54] CONFORMABLE ADHESIVE SHEET

[72] Inventors: Julius A. Lindquist, Somerville; George J. Buese, East Brunswick, both of N.J.

[73] Assignee: Johnson & Johnson

[22] Filed: Jan. 12, 1970

[21] Appl. No.: 2,225

[52] U.S. Cl. ............................128/156, 117/11, 117/47 H, 117/68.5, 117/76 F, 117/98, 117/122 F, 117/138.8 D

[51] Int. Cl. ........................................C09j 7/02, A61l 15/06

[58] Field of Search...............117/122 P, 138.8 D, 68.5, 11, 117/47 H, 76 F, 98, 122 F; 260/2.5; 128/155, 156

[56] References Cited

UNITED STATES PATENTS

| | | | |
|---|---|---|---|
| 2,955,056 | 10/1960 | Knox | 117/138.8 X |
| 3,190,842 | 6/1965 | Ringwood et al. | 117/138.8 UX |
| 3,193,441 | 7/1965 | Schafer | 117/138.8 X |
| 3,245,406 | 4/1966 | Chardack | 117/122 UX |
| 3,370,117 | 2/1968 | Blue | 264/321 |
| 3,426,754 | 2/1969 | Bierenbaum et al. | 117/122 X |
| 3,457,919 | 7/1969 | Harbard | 117/122 UX |
| 3,483,018 | 12/1969 | Waldman | 117/122 X |
| 3,499,848 | 3/1970 | Weisman | 117/138.8 UX |
| 3,506,600 | 4/1970 | Zocco et al. | 260/2.5 |

Primary Examiner—William D. Martin
Assistant Examiner—Bernard D. Pianalto
Attorney—Harold L. Warner, Michael Q. Tatlow and Robert L. Minier

[57] ABSTRACT

This pressure-sensitive adhesive sheet of improved conformability and splitting resistance which may be advantageously employed, for example, as a surgical drape or used in tape form or as part of a surgical bandage comprises a flexible polyurethane foam web which is compressedly set to less than about 50 percent of its original thickness and has a splitting resistance of at least about 20 pounds per square inch, an extent of elasticity of at least about 110 percent and a 100 percent modulus of less than about 5 pounds per inch width. A porous pressure-sensitive adhesive is applied to at least portions of one side of the web and, in certain embodiments, a low-friction coating is applied to the other side. In other embodiments, a release coating which may also have a low coefficient of friction may be applied to enhance unwindability. As a tape, the product is advantageously applied to irregularly shaped portions of the body having varied and changeable conformability requirements, such as joint locations, particularly knuckles, elbows, knees and the like.

24 Claims, 9 Drawing Figures

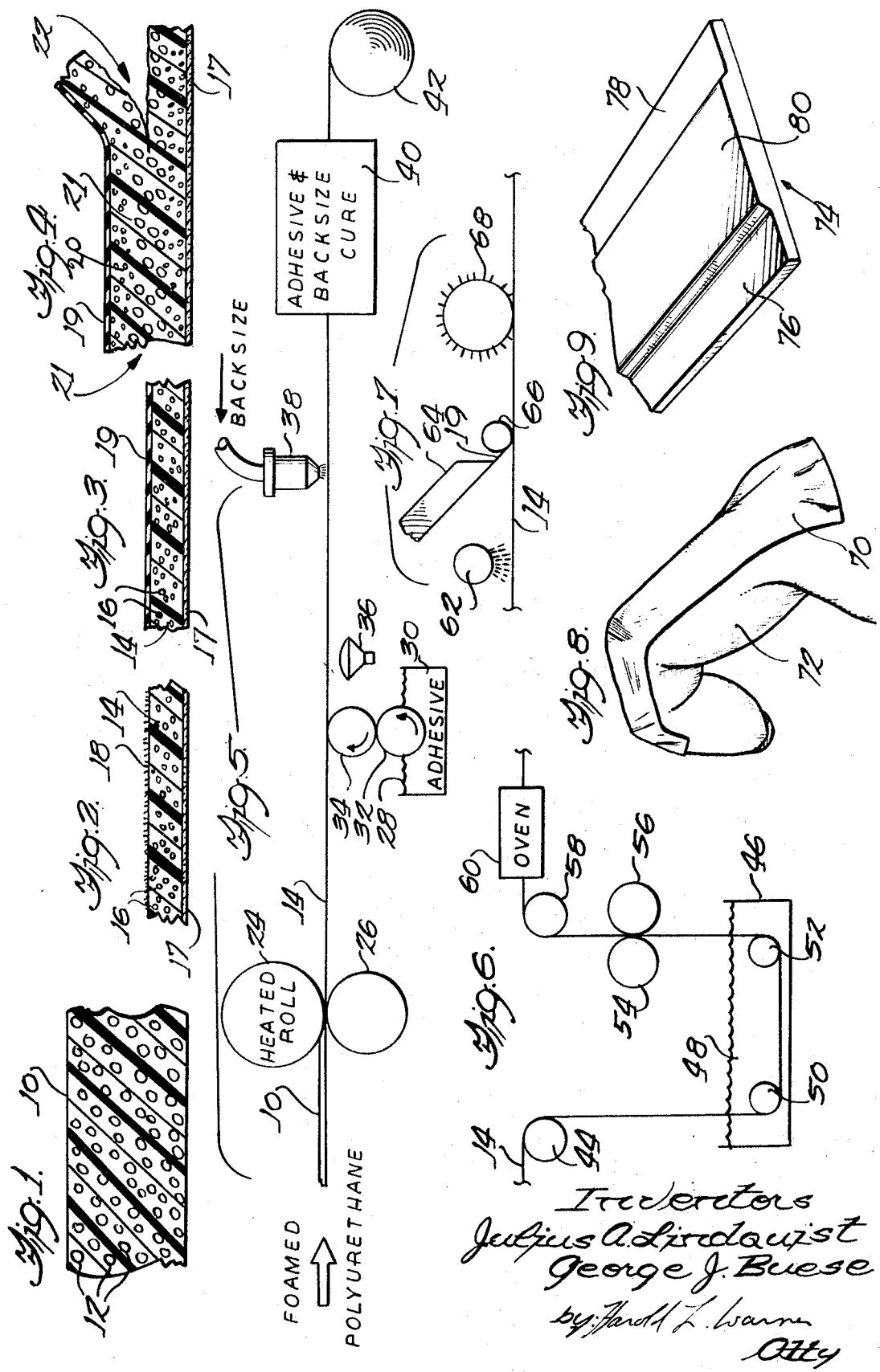

CONFORMABLE ADHESIVE SHEET

BACKGROUND OF THE INVENTION

1. Field of the Invention

This invention relates to the field of surgical drapes, tapes and bandages which comprise a supporting web and a pressure-sensitive adhesive applied to one side thereof. In a preferred embodiment, it relates to an improved surgical tape which meets all the usual desirable criteria for such products, including a high degree of breathability, but features enhanced elasticity, conformability and peel and splitting resistance, whereby the tape may be applied to irregularly shaped body portions and will be retained thereon even though body movements change the shape thereof.

While the present invention is described herein with particular reference to surgical tapes, it should be clearly understood that the invention is not limited thereto. It can be embodied in the form of surgical drapes, bandages and functional equivalents thereof as well as in various products requiring a highly conformable, porous, elastic covering having a pressure-sensitive adhesive coating on portions thereof.

2. Description of the Prior Art

A vast array of pressure-sensitive surgical tapes is already available which meets to a lesser or greater extent the various requirements for such products. They must be porous and thus breathable whereby maceration of the underlying skin tissue is minimized or eliminated. They must stick to the skin tissue when in use and yet be removable without injuring the underlying tissue or causing undue discomfiture. They must have adequate strength and good "unwind" properties when prepared in the form of rolls and must be convenient to use. They must be inert, non-irritating and non-allergy forming. They must lend themselves to sterilization, and otherwise meet antiseptic requirements. They must also meet aesthetic and cosmetic requirements, and yet be competitive in cost.

Of particular importance are the additional requirements of elasticity, conformability and peel and splitting resistance. Significant improvement in these areas, while still meeting other desired criteria, has eluded the prior art, as becomes apparent when employing prior art surgical tapes on irregularly shaped portions of the body, particularly those portions which change shape with normal body movements.

Thus, for example, it is a common experience to encounter difficulty when applying surgical tapes to fingers, knuckles, elbows, knees and other jointed areas. Either the joint must be substantially immobilized to keep the tape applied thereto or the injured party must put up with the inconvenience and medically deleterious requirement of frequently replacing loosened tape.

Other tapes which may have met the elasticity and conformability requirements suffered form poor peel resistance or were prone to splitting. Thicker tapes, e.g., one thirty-second inch or thicker, had a tendency to roll off or peel, particularly adjacent the edges. This problem was compounded by the high surface friction associated with certain materials employed for such purposes. Thinner tapes suffered from tensile strength problems or had unrecognized planes of weakness which caused separation or splitting problems, particularly when attempting to remove the tape.

It is to these prior-art problems of limited elasticity and conformability and poor peel and splitting resistance, coupled with high surface friction, that the present invention is specifically directed, although the improved product of the present invention also excels in meeting the various other aforementioned requirements for a high quality surgical tape, including the critical requirement of superior breathability. It is therefore a general object of the present invention to provide a pressure-sensitive adhesive sheet which meets the various requirements for such a product and which otherwise is superior with respect to its elasticity, conformability and peel and splitting resistance. It is another general object to provide a pressure-sensitive adhesive surgical tape which permits the wearer to be so unaware of it that he "forgets" he has it on.

It is a more specific object to provide a low cost, porous, breathable surgical tape which is elastic and conformable to irregularly shaped body portions and sufficiently thin to minimize peeling from scraping contact with other objects. It is still another object to provide a tape which will stay adhered to and conform to body portions regardless of the normal movement or change in shape thereof. It is a still more specific object to provide a pressure-sensitive adhesive sheet from a compressed polyurethane foam which is superior in splitting resistance. These and other objects of the present invention will become apparent as a detailed description proceeds.

SUMMARY OF THE INVENTION

These objects are achieved in a particular embodiment by a surgical sheet which in the broadest sense comprises a web or porous, flexible, compressed polyurethane foam of enhanced splitting resistance and having a pressure-sensitive porous adhesive coating on at least a portion of one side thereof. The opposite side of the compressed polyurethane web may be surface treated, e.g., by addition of a backsizing, porous plastic coating, suitable resin, or the like, to lower the coefficient of friction of the exposed surface and/or to provide good unwindability characteristics. A hydrophobic or hydrophilic pad may optionally be applied to a portion of the adhesive coating to form an adhesive bandage.

COMPRESSED POLYURETHANE FOAM

The web of the present invention is formed by permanently compressing flexible, foamed polyurethane sheets having a thickness of, for example, about one thirty-second to one-half inch to less than about 50 percent of the original thickness, e.g., about 5 to 40 percent of the original thickness, preferably about 10 to 25 percent, and imparting thereto a resistance to splitting of at least about 20 pounds per square inch (in a direction perpendicular to the surface). For example, a 1/16 inch foamed polyurethane sheet might be uniformly compressed to a thickness of one one hundred twenty-eight inch and have a resistance to splitting of about 26 pounds per square inch.

A minimal pre-compression thickness of about one thirty-second inch is required for strength considerations. Anything substantially thinner may inoperative. The foam web after compression should have a thickness in the range of about 0.001 to 0.025 inch, at least at or adjacent the edge portions, preferably about 0.002 to 0.010 inch, optimally about 0.003 to 0.006 inch. A compressed web having a thickness substantially greater than about 0.025 inch adjacent the edges results in pronounced edge heights which have poor peel resistance, particularly in view of the high coefficient of friction of the polyurethane foam. Also, excessively thick layers may result in undue tensile and compressive forces at the opposite surfaces upon flexure, thus reducing drapeability and conformability characteristics. A thickness substantially less than about 0.002 inch is undesirable because of the "curl under" edge problem which is associated with very thin webs having adhesive coatings where there is a tendency for the edge to curl under when a strip of tape is torn off or when a protective facing is removed as with an adhesive bandage prior to use.

The use of compressed foam assures the presence of sufficient material to meet tensile strength requirements and still provide the desired thinness of the web, particularly adjacent edge portions. Prior art attempts to use compressed foam were frustrated by the tendency of the web to split. It has been discovered, however, that this splitting characteristic is a result of the inherent weakness of the foam. The compression, even though it may impart a permanent set in the foam sheet, in such instances has not strengthened the foam web throughout its thickness. As a result there have been left planes of weakness in the web. It has now been discovered that these planes of weakness can be eliminated and compressed webs having a splitting resistance of at least 20 pounds per square inch consistently obtained if the compression is carried out at a sufficiently high temperature and for a sufficient length of time to fuse crossover junctions of the cell walls. This fusing, referred to, is readily apparent on examining cross sections of compressed polyurethane foams to which a permanent set has been imparted by the compression. For example, photomicrographic studies of prior art compressed foams to which lateral stress is applied reveal that foam cells are expanded. With foams compressed in accordance with the present invention, however, where not only heat and pressure are applied, but sufficient time is permitted to elapse to permit fusion at the crossover junctions of the cell walls throughout the foam, a substantially uniform cross section is observed when examined under the same conditions with no cell expansion being apparent. Accordingly, with previous compressed foam backings instead of the pressure-sensitive adhesive being released from the underlying skin, as desired, whereby the complete tape could be removed, the tape would split, leaving the lower or inner portion with the pressure-sensitive adhesive adhered to the skin.

To cope with the problem, the compressed foam of the present invention is uniformly compressed and fused throughout its cross section to eliminate or minimize planes of potential splitting. Alternatively, or in addition, the compressed foam is impregnated with a strengthening medium, whereby strength, including splitting resistance, is imparted. In practice, a splitting resistance of at least about 20 pounds per square inch, preferably at least about 24 pounds per square inch, typically about 25 to 30 pounds per square inch, has been found satisfactory, whereby complete removal of the tape is possible.

As previously indicated, strengthening impregnant may be used. The strengthening impregnant may be used both for increasing strength of foams where the compression is non-uniform and the impregnant may also be advantageously employed when the degree of compression and fusion, although substantially uniform, is relatively light, e.g., where the compression is 40–50 percent of original thickness, in contrast to the preferred range of about 10 to 25 percent. To a limited extent, the use and level of a strengthening impregnant can be traded off against additional compression.

Suitable strengthening impregnants include acrylic latex binders, thermoplastic polyurethane used in emulsion or solution form such as Estane (thermoplastic polyurethanes for solution application sold by B. F. Goodrich Chemical Co.) and ionomer resin dispersions such as described in U.S. Pat. No. 3,322,734 and presently sold by E. I. du Pont de Nemours & Company, Inc. under the trade name Surlyn D 1230. The suitability of other impregnants can readily be determined by those skilled in the art. The impregnants may be added by conventional techniques, including padding, gravure roll, and the like, preferably padding.

The polyurethane foam of the present invention may be either polyester or polyether polyurethane foam typically having a density before compression in the range of about 1 to 6 pounds per cubic foot and a pore count in the range of about 10 to 150 pores per inch, preferably about 50 to 100. While both fully reticulated and partially reticulated foams may be employed, the partially reticulated are sometimes preferred because of cost considerations. These foams, even after the compression contemplated by the present invention but before addition of the adhesive mass, have a high MVT (moisture vapor transfer), e.g., about 50 to 2,500 grams per 100 square inches in 24 hours, typically 100 to 1,000 grams per 100 square inches in 24 hours. The MVT may be substantially reduced by the addition of the adhesive mass. For example, a 1/16 inch foam which was permanently compressed to an average thickness of about 3.2 mils had an MVT of 512 without any adhesive and about 53 after addition of an acrylate mass at the level of 1.0 ounce per square yard.

Because the conformability of the tape is enhanced if it is stretched slightly when applied, it should have an extent of elasticity such that it can be stretched in any direction at least about 10 percent beyond its original dimension and return upon release and preferably about 10 to 30 percent beyond its original dimension. The ultimate elongation before rupture is typically substantially greater, e.g., about 200 to 500 percent, or two to five times its original dimension.

To assure that the tape can be stretched without requiring excessive forces, the 100 percent modulus (the force per unit width required to stretch the tape 100 percent beyond its original dimension) should be no greater than about 5 pounds per inch width, preferably less than about 3.0 pounds, e.g., 0.5 to 2.5 pounds per inch width. The 100 percent modulus is, of course, related to thickness. In a specific example, a polyurethane foam which was uniformly compressed from a thickness of 3/32 inch to about 11 mils had the following characteristics:

| Impregnant | Impregnant Level Oz./yd.$^2$ | 100% Modulus Lbs./In. Width | Ultimate Elongation % |
|---|---|---|---|
| Untreated | — | 1.21 | 384 |
| Acrylic | 0.9 | 1.3 | 316 |
| Surlyn | 0.32 | 1.63 | 253 |
| Estane | 0.57 | 1.44 | 369 |

Polyester polyurethane foams are preferred in the practice of the present invention because cell size may be more readily controlled and because of their superior tensile strength characteristics. A typical polyester polyurethane foam may be prepared, for example, as set forth in Example II of U.S. Pat. No. 2,956,310.

A typical polyether polyurethane may be prepared, for example, form the following formulation:

|  | Parts by Weight |
|---|---|
| Polyether Triol 3000 MW | 40 parts |
| Polyether Diol 2000 MW | 60 parts |
| Toluene Diisocyanate 80/20% | 38 parts |
| Water | 2.9 parts |
| Ethylmorpholine | 1.0 parts |
| Silicone Copolymer Surfactant | 1.0 parts |
| Stannous Oleate | 1.5 parts |
| Total | 144.4 parts |

The above ingredients are mixed in a Martin Sweets impeller mixer, a low shear continuous mixer, just until a homogeneous liquid is formed and then cast onto a carrier paper to form a continuous slab. The slab may be sliced or pared to a desired thickness if the as-produced thickness is too great.

The resulting foamed polyurethane has a high degree of elasticity. For example, a 0.625 × 1 inch specimen may be stretched to 0.80 × 1.28 inch configuration (or 128 percent of the original dimensions while remaining capable of returning to their original dimensions on release of the stretching forces.

The polyurethane foam may be formulated to obtain hydrophobic or hydrophilic properties — or even other properties — as desired. For example, polyurethanes based on polyols that are derived from castor oil are very non-absorbent. These may be treated by employing dilute dip coatings of surfactant in order to make the same hydrophilic if desired. For example, the polyurethane foam produced from the polyether formulation set forth immediately above is hydrophobic. To render the pore surfaces wettable and impart excellent absorbent properties to it, it can be passed through a bath of 3 percent sodium lauryl sulfate aqueous solution and subsequently air dried. These and other techniques for "tailor-making" the foam to achieve desired end properties will be apparent to those skilled in the art in the light of the present disclosure.

The permanent compression of the polyurethane sheet may be carried out by any technique known to those skilled in the art. For example, the sheet may be compressed between heated platens while held at a temperature in the range of, for example, 350° to 800° F. Alternatively, the permanent compression may be imparted by a heated roll with backup roll or a plurality of opposed heated rolls.

The compression involves a time-temperature-pressure relationship which in turn depends in part on the particular foam being processed and the degree of compression. Temperatures may range, for example, from 350° F. to 800° F., preferably 450° to 700° F. Pressure may range from 2 to 20 pounds per square inch, preferably 3 to 15 pounds per square inch. The proper relationship can best be determined by experimentation and trail and error.

For example, with a polyester polyurethane foam of the type described in U.S. Pat. No. 2,956,310 utilizing a pressure of about 8 pounds per square inch with a temperature of 460° F. and a compression time of 4 seconds only partial fusion is obtained. On increasing the dwell time to 10 seconds maximum fusion at the junctions of all crossover points is obtained with resulting maximum strength. If the dwell time is continued for as much as a minute, there is substantial damage to the foam.

In a typical situation involving a fourfold or more thickness reduction, a polyurethane foam is permanently compressed by passing it between a steel roll heated to about 490° F. and a rubber backing roll at a speed of approximately 9 feet per minute, the pressure approximating about 6 to 12 pounds per square inch. The compression step manifestly can be carried out on a continuous basis employing elongated polyurethane sheets.

THE PRESSURE-SENSITIVE ADHESIVE

The adhesive which is applied to the compressed polyurethane foam can be any conventional porous pressure-sensitive adhesive used in the preparation of surgical tapes, adhesive bandages and the like, the particular type per se not being part of the present invention other than being a necessary part of the claimed construction. Suitable adhesives are, for example, the rubber-base adhesives and the acrylate pressure-sensitive adhesives presently used in adhesive bandage construction, preferably the acrylate adhesives. One operable form of pressure-sensitive adhesive is a pure rubbery copolymer of isooctyl acrylate and acrylic acid in 94:6 ratio, as described in Ulrich U.S. Pat. No. 2,884,126 (Reissue 24,906). A technique for developing the desired and necessary microporous structure therein so as to achieve a high MVT, e.g., about 50 to 500 grams per 100 square inches in 24 hours, is described in Copeland U.S. Pat. No. 3,121,021. Other techniques known to those skilled in the art may also be employed.

The adhesive may be applied to the compressed polyurethane foam by conventional techniques, including, for example, transfer techniques, spray techniques, the use of a "kissing" roll, and the like. The adhesive mass is generally firmly bonded to the compressed foam, no primer normally being required to anchor the mass. Volatiles may be flashed from the mass as soon as applied so that solids will not penetrate too deeply into or bleed through the compressed foam.

In a typical transfer technique, the adhesive mass is coated on a release paper having a heat-resistant, insoluble anti-stick surface. It is passed through an oven to blow and cure the mass. The compressed foam is then laminated to the mass by being pressed down thereon at the end of the oven line, the release paper ultimately being removed.

When applying the mass by spraying, the volatiles therein are flashed and the mass is disposed on the compressed foam in a stringy pattern. The stringy mass is anchored during the subsequent oven treatment, resulting in a highly breathable coating.

The amount of adhesive depends upon the particular adhesive, the end use of the product, and the like. In a typical surgical tape embodiment, the weight of the dry adhesive layer may be in the range of about 25 to 100 pounds per 1,000 square yards.

LOW FRICTION COATING — RELEASE COATING

Polyurethane foam has a relatively high coefficient of surface friction, particularly when in contact with clothing and other fabrics. This produces, in most situations, including surgical tape applications, undesirable forces which cause awareness of the tape, pain and discomfort and a tendency to strip or peel the tape from the underlying surface when the exposed surface rubs against another material. Compression of the foam substantially decreases the coefficient of surface friction, but not sufficiently for most applications. Moreover, for many applications the adhesive free surface should have good release properties to obtain, for example, good unwindability of the product when packaged in roll form.

Accordingly, various surface treatments have been devised to decrease surface friction and/or to impart desired release properties. These include coating with a conventional backsize, e.g., those described in U.S. Pat. No. 2,913,355, or treatment with various commercially available friction-reducing agents, e.g., Silicolease 425 (rapid-curing silicone release coating sold by Imperial Chemical Industries America Inc.), the aforementioned Surlyn D 1230, or combinations of friction reducing agents and backsize.

Conventional application techniques may be employed. For example, the backsize is preferably applied by gravure roll techniques. When the backsize has a low solids content, e.g., less than about 20 percent, the backsize may also be sprayed on the surface of the tape whereby much of the solvent evaporates during the spraying, the solids concentration is increased, and little of the solids content penetrates into the foam interior. As a result, the surface of the foam is coated with discrete particles of the backsizing agent anchored to the foam surface. The backsize is preferably applied after application of the adhesive mass and prior to the cure thereof. Thus, both the backsize and the adhesive mass may be cured simultaneously.

The effect of compression and such surface treatments on a typical polyurethane foam is evident from the following frictional force and release data. The frictional force data were obtained using an Instron Universal Tester with a 117-gram load weight, a sample travel of 5 inches, a sample travel rate of 5 inches per minute and cotton fabric Lytron 80 × 56 as the substrate material:

| Polyurethane Foam and Treatment | Frictional Force, grams | Good Release |
| --- | --- | --- |
| Non-Compressed Foam | 284 | No |
| Compressed — No Treatment | 194.7 | No |
| Compressed + Backsize | 128.8 | Yes |
| Compressed + Silicolease 425 | 90.7 | Yes |
| Compressed + Surlyn D 1230 | 85.6 | No |
| Compressed + Surlyn and Backsize | 81.2 | Yes |

In still another embodiment of the present invention, the function of a surface treatment is performed by a thin film of a suitable porous plastic, e.g., polyethylene, polypropylene, and the like, preferably polyethylene. So that the plastic film will tightly adhere to the polyurethane foam, the surface may be primed. In a specific embodiment, the compressed polyurethane foam is primed with an ionomer resin dispersion, e.g., the aforementioned Surlyn D 1230, and a polyethylene film is extruded thereon so as to produce a polyethylene layer having approximately 0.1 to 0.5 mil thickness.

Porosity is built into the polyethylene film by mechanical perforation on the extrusion line, by spark or corona discharge, or the like. Such polyethylene films show good release from pressure-sensitive acrylate adhesives and also exhibit a desirable low coefficient of surface friction.

While peel resistance is enhanced by the low-coefficient-of-friction coating, the overall high level of peel resistance of the product of this invention results from a combination of several factors. These include the high degree of conformability, the thinness of the web, particularly adjacent the edges, as well as the low coefficient.

BRIEF DESCRIPTION OF THE DRAWINGS

The present invention will be more clearly understood from the following detailed description of specific embodiments, read in conjunction with the accompanying drawings, wherein:

FIG. 1 illustrates in magnified cross section a sheet of polyurethane foam prior to the permanent compression thereof;

FIG. 2 illustrates in magnified cross section the same sheet after uniform compression and application of the pressure-sensitive adhesive on one side and the backsize on the other or normally exposed side;

FIG. 3 illustrates in magnified cross section the embodiment wherein a porous plastic film rather than backsize is coated on the normally exposed surface;

FIG. 4 illustrates in magnified cross section a sheet of prior-art, non-uniformly compressed polyurethane foam and the splitting problem associated therewith;

FIG. 5 is a schematic illustrating production of the product of the present invention, including the addition of the backsize;

FIG. 6 illustrates an alternative embodiment of the schematic of FIG. 5, wherein non-uniformly compressed polyurethane foam such as is illustrated in FIG. 4 is impregnated with a strengthening agent;

FIG. 7 illustrates an alternative embodiment of the schematic of FIG. 5, wherein an extruded polyethylene film is applied (after priming the web) in place of a backsize;

FIG. 8 illustrates the surgical tape of the present invention applied to the partially flexed index finger of a patient, including the knuckle and finger joints; and FIG. 9 illustrates a surgical tape embodiment of the present invention wherein edge portions are compressed to a greater extent than the intermediate portion.

DESCRIPTION OF PREFERRED EMBODIMENTS

Referring to FIG. 1, the starting material for the product of the present invention is polyester polyurethane foam 10 having a porous cellular structure depicted by generally circular pore symbols 12. Foam 10 is formulated so as to have a high extent of elasticity, e.g., about 125 percent of its original dimensions. Foam 10 is permanently and uniformly compressed and fused throughout its cross section from its original thickness, e.g., one-eighth inch, to less than half such thickness, e.g., about one eighth of its original thickness, e.g., one sixty-fourth inch, as depicted by web 14 in FIG. 2, which manifestly is on a larger scale than FIG. 1 for convenience of illustration. Despite the substantial compression, which together with the fusion strengthens web 14 and makes it split resistant, web 14 still retains its elasticity and also the highly porous structure indicated by pores 16, whereby the web has a high degree of breathability.

A pressure-sensitive acrylate adhesive 17 is coated to a thickness of about 2 mils on one side of compressed web 14 and a conventional backsize or release coating 18 is applied to the other side thereof. The adhesive may have been blown during evaporation of the solvent to make it porous or may have been applied in an open pattern. Alternatively, a 0.2 mil extruded polyethylene film 19, which is perforated throughout its area to achieve a high degree of porosity, may be used in place of the backsizing, as depicted in FIG. 3. The thickness of film 19 is exaggerated in FIG. 3 for convenience of illustration.

FIG. 4 illustrates certain prior-art compressed foams 20, which, although compressed, are not fused, resulting in a plane of weakness 21 adjacent the center. When subjected to separating or peeling forces, splitting often results, as indicated at 22. Such splitting-prone foams may be employed in the practice of the present invention if strengthening resins are added as indicated earlier and as discussed hereinafter in connection with FIG. 6 to improve their internal strength.

A schematic of the production steps is illustrated in FIG. 5 wherein a web of the polyurethane foam 10, which may be several feet wide or wider, is fed to the nip of heated steel roll 24 and hard-rubber backup roll 26. The nip pressure between rolls 24 and 26 is adjusted so as to reduce the thickness of foam 10 to about one-eighth of its original size. Roll 24 is operated, for example, at about 490° F. and the web speed through the nip is about 9 feet per minute, thereby producing a web of permanently compressed foam 14.

The pressure-sensitive acrylate adhesive 28, e.g., the adhesive described in U.S. Pat. No. 3,325,459, having 45-50 percent solids, is transferred from vessel 30 by means of partially-immersed transfer roll 32 to "kiss" roll 34 which contacts or "kisses" web 14 and thereby transfers the adhesive to the surface thereof. To prevent excessive migration of the adhesive 28 into web 14, the volatile content thereof is almost immediately reduced or eliminated. This flashing operation is facilitated by infrared heaters 36 which are located adjacent kiss roll 34 and transverse web 14.

A conventional backsize, such as is disclosed in U.S. Pat. No. 2,913,355, and having a low solids content, e.g., 5 to 10 percent, is sprayed on web 14 by means of nozzle means 38. Because much of the solvent evaporates or flashes during the spraying, the solids concentration on the web is high and little penetrates into the foam interior. Web 14 with the adhesive coating and backsize thereon then enters curing oven 40, wherein curing temperatures, e.g., 150° to 400° F. are maintained.

The cured product is then rolled on product roll 42 for further disposition. The cured product may be cut or sliced into any desired widths, before or after being accumulated on product roll 42, which could be a series of individual rolls.

Strengthening resins or binders may be added to the foam before or after compression, preferably by padding techniques illustrated in FIG. 6. Thus, for example, web 14 exiting from compression rolls 24 and 26, may pass over direction-changing roll 44 and enter resin tank 46 for immersion in ionomer resin dispersion 48. After changing directions around rolls 50 and 52, the web passes between squeeze or metering rolls 54 and 56, over direction-changing roll 58 into oven 60, where it is dried at, for example, about 225° to 300° F. The remainder of the process steps may be as already depicted in FIG. 5.

The embodiment of FIG. 3 is produced by the production variation illustrated in FIG. 7. Instead of applying backsize via nozzle 38, a primer, e.g., Surlyn D 1230, is sprayed on web 14 via distributor 62 and dried. A thin film of polyethylene 19 having a thickness of about 0.2 mils is extruded from extrusion apparatus 64 onto the surface of web 14 which is then passed under a chill roll 66, and then under a perforating roll such as needle wheel 68 to make the film porous. Because of the primer, polyethylene film 19 is tightly adhered to web 14 and remains adhered under stress. In place of needle wheel 68, a spark or corona discharge perforator (not shown) or other techniques for imparting porosity may be substituted.

Because web 14, adhesive 17 and sizing 18 (or film 19) are all highly porous and elastic, the resulting composite product has the same attributes. Because of such elasticity and the nature of the compressed polyurethane web, which is stretchable in all directions and has a low 100 percent modulus, the final product can be readily applied to irregularly shaped surfaces and exhibits a surprisingly high degree of conformability even when the surfaces change in shape after application of the product.

This is illustrated in FIG. 8, wherein surgical tape 70 has been applied longitudinally to the index finger 72 of a human hand. Despite the fact that the surface is transversely curved and the tape passes over the knuckle and two finger joints, the tape smoothly conforms to the skin surface regardless of the flexure of the knuckle or finger joints. Because of its high porosity, practically no maceration of the skin tissue results even when the tape is adhered to the skin for extended periods. Because of the low coefficient of surface friction and thin edges, there is practically no tendency to peel and the wearer can forget he's wearing the tape. Yet, when the tape is removed, there is no tendency to split.

Best adherence is obtained by slightly stretching the tape during application, e.g., to about 5 to 10 percent beyond its original dimension. One possible explanation for the improved adherence may be creep relaxation which is overcome by pre-stressing.

While the embodiments illustrated are surgical tapes, adhesive bandages may be produced therefrom by securing an absorbent or non-absorbent pad, as desired, to a portion of pressure-sensitive adhesive coating. The pad employed should preferably have a degree or extent of elasticity similar to or substantially the same as that of the compressed foam, e.g., about 110 to about 130 percent. It may be prepared from polyurethane foam also, although not necessarily so.

The bandage may, for example, be in the form of pressure-sensitive adhesive-coated strips extending on either side of the pad, or where so-called "spot" bandages are used, the adhesive coated compressed polyurethane web can extend beyond all edges of the pad. Since such bandages are typically not packaged in roll form, good unwind characteristics are not necessary and thus a release coating may be omitted. If omitted, a coating to achieve a lowered coefficient of surface friction may still be required.

Still another advantageous embodiment is illustrated in FIG. 9. Surgical tape 74, the underside or hidden surface of which is coated with a pressure-sensitive adhesive, has opposed edge portions 76 and 78 which are compressed substantially more than intermediate portion 80, the relative thicknesses in FIG. 9 being qualitatively depicted and not to scale. For example, edge portions 76 and 78 may be one-eighth inch wide and have a thickness of about 3 mils. In contrast, intermediate portion 80 may have a thickness from 10 to 25 mils, or substantially more. In fact, where a pronounced padding effect is desired, intermediate portion 80 need not be compressed at all, and may have any desired thickness. In such latter embodiment it may be desirable to limit application of the pressure-sensitive adhesive to the undersurface of edge portions 76 and 78 and also to impregnate with a strengthening medium so that strength is increased and splitting problems are avoided.

The embodiment of FIG. 9 represents an advantageous compromise of seemingly conflicting requirements. By having thin edge portions of high strength, the advantages of good peel and splitting resistance are achieved, along with all the other advantages associated with flexible polyurethane foams. By having a thick center portion, a desirable padding effect is achieved.

From the above description it is apparent that the objects of the present invention have been achieved. While only certain embodiments have been illustrated, many alternative modifications will be apparent from the above description to those skilled in the art. For example, while the disclosure is specific to compressed polyurethane foams, the inventive concept has application to functionally equivalent thermoplastic foams, such, for example, as vinyl foams, styrene butadiene foams and some rubber based foams. These and other alternatives are considered within the spirit and scope of the present invention, and coverage thereof is intended by patents based on this application.

Having described the invention, what is claimed is:

1. A porous, breathable, surgical, conformable sheet comprising in combination:
   a. a web of compressed, flexible, polyurethane foam having, prior to compression, a thickness of from about one thirty-second inch to about one-half inch and a pore count of about 10 to 150 pores per lineal inch and, after compression, a thickness of less than about 50 percent of its original thickness, a resistance to splitting of at least about 20 pounds per square inch in a direction normal to the surface of the web, an extent of elasticity of at least about 110 percent and a 100 percent modulus of less than about 5 pounds per inch of width; and
   b. a pressure-sensitive adhesive on at least portions of one side of said web.

2. The conformable sheet of claim 1 wherein the web is impregnated with strengthening binder and, as a result of compression, the crossover junctions of the cell walls are fused, the impregnation and fusing being sufficient to achieve the resistance to splitting of at least about 20 pounds per square inch in a direction normal to the surface of the web.

3. A conformable sheet of claim 1 in which said adhesive is in the form of a porous pressure-sensitive adhesive coating.

4. The comformable sheet of claim 1 wherein said web is substantially uniformly compressed throughout the cross section.

5. The conformable sheet of claim 1 wherein portions of said web are substantially less compressed than other portions thereof, at least said former portions being impregnated with sufficient strengthening binder to achieve a resistance to splitting of at least about 20 pounds per square inch in a direction normal to the surface of the web.

6. The conformable sheet of claim 5 wherein said binder comprises an ionomer resin.

7. The conformable sheet of claim 5 wherein said binder comprises acrylic resin.

8. The conformable sheet of claim 5 wherein said binder comprises urethane polymer.

9. The conformable sheet of claim 3 including a low-coefficient-of-friction coating on the other side of said web.

10. The conformable sheet of claim 3 including a release coating on the other side of said web to impart improved unwindability characteristics.

11. The conformable sheet of claim 1 including a backsize on the other surface of said web whereby unwindability is enhanced and the coefficient of friction of the exposed surface is reduced.

12. The conformable sheet of claim 1 including a plastic film on the other surface of said web whereby unwindability is enhanced and the exposed surface has a reduced coefficient of friction.

13. The conformable sheet of claim 12 wherein said plastic film comprises porous polyethylene film.

14. The conformable sheet of claim 1 wherein the compressed polyurethane foam of said web comprises polyester polyurethane and said pressure-sensitive adhesive coating comprises acrylate adhesive.

15. The conformable sheet of claim 1 wherein at least peripheral portions of said web, after compression, have a thickness in the range of about 2 to 25 mils.

16. The conformable sheet of claim 15 in which said sheet is impregnated with a strengthening binder.

17. The conformable sheet of claim 15 in which said binder comprises ionomer resin.

18. The conformable sheet of claim 15 in which said binder comprises acrylic resin.

19. The conformable sheet of claim 15 in which said binder comprises urethane polymer.

20. The conformable sheet of claim 1 in tape form wherein edge portions have a thickness in the range of about 3 to 6 mils and inner portions thereof have a thickness substantially greater than said edge portions.

21. The conformable sheet of claim 1 in tape form including a pad adhered to a portion of said porous pressure-sensitive adhesive.

22. The conformable sheet of claim 21 wherein said pad has an extent of elasticity substantially the same as that of said web.

23. The conformable sheet of claim 1 wherein, as a result of compression, the crossover junctions of the cell walls of the web are fused to an extent sufficient to achieve the resistance to splitting of at least 20 pounds per square inch.

24. The conformable sheet of claim 1 wherein the web is impregnated with sufficient strengthening binder to achieve the resistance to splitting of at least about 20 pounds per square inch.

* * * * *